United States Patent
Wu et al.

(10) Patent No.: US 10,696,579 B2
(45) Date of Patent: Jun. 30, 2020

(54) METHOD OF REPAIRING SURFACE SMOOTHNESS OF HEAT-BENT GLASS

(71) Applicant: Xiulan Wu, Shenzhen, Guangdong (CN)

(72) Inventors: Xiulan Wu, Shenzhen (CN); Zhiguang Wen, Yichun (CN)

(73) Assignee: Xiulan Wu, Shenzhen, Guangdong Province (CN)

( * ) Notice: Subject to any disclaimer, the term of this patent is extended or adjusted under 35 U.S.C. 154(b) by 207 days.

(21) Appl. No.: 15/681,949

(22) Filed: Aug. 21, 2017

(65) Prior Publication Data

US 2018/0354838 A1   Dec. 13, 2018

(30) Foreign Application Priority Data

Jun. 7, 2017   (CN) .......................... 2017 1 0423950

(51) Int. Cl.
| | |
|---|---|
| *C03B 23/02* | (2006.01) |
| *C03B 23/023* | (2006.01) |
| *C03B 40/00* | (2006.01) |
| *C09D 4/00* | (2006.01) |
| *C03C 17/32* | (2006.01) |
| *C09D 4/06* | (2006.01) |
| *C03B 23/03* | (2006.01) |

(52) U.S. Cl.
CPC .......... *C03B 23/0235* (2013.01); *C03B 40/00* (2013.01); *C03C 17/32* (2013.01); *C09D 4/00* (2013.01); *C09D 4/06* (2013.01); *C03B 23/0307* (2013.01); *C03C 2218/13* (2013.01)

(58) Field of Classification Search
CPC .... C03B 23/025; C03B 23/03; C03B 23/0302
USPC ............................................................. 65/28
See application file for complete search history.

(56) References Cited

U.S. PATENT DOCUMENTS

| | | | |
|---|---|---|---|
| 6,689,426 B1 * | 2/2004 | Murahara | B05D 3/062 427/164 |
| 2018/0024594 A1 * | 1/2018 | Park | C09J 7/22 156/60 |

FOREIGN PATENT DOCUMENTS

EP      3012708 A1 *  4/2016  ........... B32B 17/064

* cited by examiner

*Primary Examiner* — Cynthia Szewczyk
(74) *Attorney, Agent, or Firm* — Li & Cai Intellectual Property (USA) Office

(57) ABSTRACT

A method for repairing surface smoothness of heat-bent glass includes: providing a fluid which is transparent and solid at room temperature on an inner side of a heat-bent clear glass used for manufacturing a screen protector of an electronic device; by utilizing a mold having a pattern corresponding to the surface smoothness of a screen of the electronic device, pressing the inner side of the heat-bent clear glass and at the same time processing the fluid on the inner side of the heat-bent clear glass through a molding process so that the fluid fill a curved and uneven surface of the inner side of the heat-bent clear glass; and curing the fluid so that the inner surface of the heat-bent clear glass has a curvature and smoothness that match the curvature and smoothness of the screen of the electronic device.

12 Claims, 2 Drawing Sheets

METHOD OF REPAIRING SURFACE SMOOTHNESS OF HEAT-BENT GLASS

BACKGROUND

1. Technical Field

The present disclosure relates to the technical field of repairing heat-bent glass, in particular, to a method of repairing surface smoothness of heat-bent glass.

2. Description of Related Art

A heat-bent glass is a bent glass which is formed by heating and softening a flat glass to mold it in a mold, and then the molded glass is annealed to form the bent glass. Despite being widely used in the field of tempered glass protection membranes, certain technical problems become inevitable when heat-bent glasses are applied. Generally, a tempered glass protection membrane is made of a combination of a heat-bent clear glass and an adhesive layer. The heat-bent clear glass adheres to an electronic device screen through the adhesive layer, in which the adhesion between the adhesive layer and the heat-bent clear glass is formed by using a simple bonding manner. Owing to problems of existing processing processes, the surface, in particular the curved surface, of a processed heat-bent clear glass would be uneven. The adhesive layer cannot fully adhere to the heat-bent clear glass because of uneven surface, thus resulting in the generation of bubbles and unappealing appearance.

SUMMARY

The primary purpose of the present disclosure is to provide a method of repairing surface smoothness of heat-bent glass to overcome the existing drawbacks. The method includes the following steps: S1: providing a fluid which is transparent and solid at room temperature on an inner side of a heat-bent clear glass used for manufacturing a screen protector of an electronic device; S2: by utilizing a mold having a pattern corresponding to the surface smoothness of a screen of the electronic device, pressing the inner side of the heat-bent clear glass and at the same time processing the fluid on the inner side of the heat-bent clear glass through a molding process so that the fluid fill a curved and uneven surface of the inner side of the heat-bent clear glass; and S3: curing the fluid so that the inner surface of the heat-bent clear glass has a curvature and smoothness that match the curvature and smoothness of the screen of the electronic device In a preferred embodiment, the way of processing the fluid includes a hot pressing process and/or the way of curing fluid includes a UV curing process, natural coagulation or drying.

In a preferred embodiment, the fluid is selected from at least one of the group consisting of: UV adhesive, thermoplastic elastomer pressure-sensitive adhesive, glue, hot melt adhesive, oil-based adhesive or water-based adhesive, and resin.

In a preferred embodiment, the method further includes removing the fluid overflowing from the heat-bent clear glass during the molding process.

In a preferred embodiment, the fluid is a thermoplastic elastomer pressure-sensitive adhesive that is transparent at room temperature.

In a preferred embodiment, in step S2, the mold is heated to 80-300° C. and the duration of heating is 1-80 seconds.

In a preferred embodiment, a melt flow rate of the fluid is 1.0 g/10 min to 30 g/10 min at a temperature of 230° C. and with a loading of 2.16 kg, and the fluid is transparent and solid at a temperature of 10-30° C.

In a preferred embodiment, the transparent fluid includes a linear block copolymer, an adhesion improver, butadiene units and additives, and wherein the linear block copolymer has a weight-average molecular weight of 50,000-500,000 and a block structure of S-B-S, in which S is styrene polymer block, the amount of which is 5 percent by weight to 30 percentage by mass, B is diolefine copolymer block, the amount of which is 70 percent by weight to 95 percent by weight, and a weight ratio of the linear block copolymer to the adhesion improver is 1:40-50.

In a preferred embodiment, the linear block copolymer is selected from at least one of the group consisting of: SIS, SBS, SEBS and SEPS, and the adhesion improver is selected from at least one of the group consisting of white oil, naphthenic oil and hydrogenated naphthenic oil.

According to one exemplary embodiment of the present disclosure, a laminated structure is provided, which includes a heat-bent glass with a surface repaired using the method according to the present disclosure.

To sum up, the present disclosure has the advantages as follows, which includes: providing a fluid which is transparent and solid at room temperature on an inner side of a heat-bent clear glass used for manufacturing a screen protector of an electronic device; by utilizing a mold having a pattern corresponding to the surface smoothness of a screen of the electronic device, pressing the inner side of the heat-bent clear glass and at the same time processing the fluid on the inner side of the heat-bent clear glass through a molding process so that the fluid fill a curved and uneven surface of the inner side of the heat-bent clear glass; and curing the fluid so that the inner surface of the heat-bent clear glass has a curvature and smoothness that match the curvature and smoothness of the screen of the electronic device. The method can resolve the prior art technical problem involving the unevenness of the curved surface of a heat-bent glass and make a revolutionary development in tempered glass screen protector.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1:
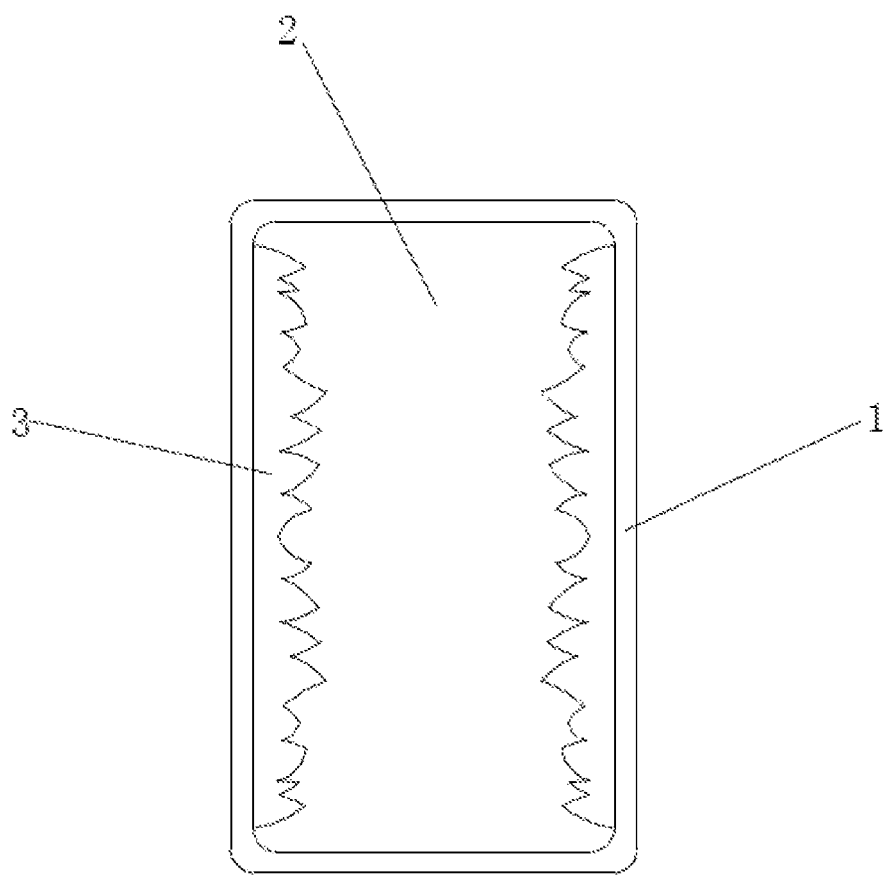
FIG. 1 is a schematic diagram illustrating an adhesive layer and an unprocessed heat-bent clear glass being stuck together.

Reference will now be made in detail to the exemplary embodiments of the present disclosure, examples of which are illustrated in the accompanying drawings. Wherever possible, the same reference numbers are used in the drawings and the description to refer to the same or like parts.

Where a range of values is provided, it is understood that each intervening value, to the tenth of the unit of the lower limit unless the context clearly dictates otherwise, between the upper and lower limit of that range and any other stated or intervening value in that stated range is encompassed within the present disclosure. The upper and lower limits of these smaller ranges which may independently be included in the smaller ranges is also encompassed within the present disclosure, subject to any specifically excluded limit in the stated range. Where the stated range includes one or both of the limits, ranges excluding either both of those included limits are also included in the present disclosure.

As stated in the present disclosure, a "heat-bent glass" is a bent glass which is formed by heating and softening a flat glass to mold it in a mold, and then the molded glass is annealed to form the bent glass. It is well-known that there are no solutions provided to achieve effective protection of curved surface screen and better adhesion between a heat-bent glass and an electronic device screen. Conventionally, two solutions are commonly used in the existing skills. One is to shrink the glass membrane, and the other is to cover the planar full-screen glass. However, the solutions both cannot enable the glass membrane to fully cover the screen nor make the glass membrane closely adhere to the screen. In addition, the technical problems of generating bubbles and the glass membrane peeling off easily cannot be avoided. The repaired heat-bent glass derived from the method of the present disclosure can be specifically applied to the protection of the curved surface screen as mentioned above.

The term "smoothness" as disclosed in the present disclosure refers to the degree of flatness of the inner surface of a heat-bent glass, e.g. a tempered glass for screen protection, after it is processed. Preferably, "smoothness" refers to the smoothness of a flat tempered glass. An example of low smoothness is the unevenness of the thickness of the glass, which causes distorted reflections and optical distortions and further affects the visual quality provided by the product. Furthermore, referring to FIG. 1 when a prior art heat-bent glass 1 is combined with an adhesive layer 2 to protect a screen 4, the combination with the adhesive layer 2 will not be perfect owing to the existing level of smoothness, that is, bubbles 3 will be generated between the adhesive layer 2 and the heat-bent glass 1, leading to unappealing appearance of the screen and lowering the level of adhesion between the adhesive layer 2 and the heat-bent glass 1. One of the objectives of the method of the present disclosure is to reduce the smoothness of the heat-bent glass 1. More specifically, the smoothness of the heat-bent glass 1 can be lowered to 0.15 or below by the method of the present disclosure.

The term "fluid" disclosed in the present disclosure refers to any substances that is transparent and solid and can flow at room temperature. Preferably, the fluid is an organic fluid or an inorganic fluid that can flow at high temperature, e.g. above 50° C., preferably above 80° C., more preferably above 100° C. and below 350° C., still more preferably below 300° C., and still even more preferably below 250° C. The fluid is transparent and solid at room temperature, e.g. −5° C. to 40° C., more preferably 0° C. to 30° C., and even more preferably 5° C. to 27° C.

According to some embodiments of the present disclosure, the solid formed of the fluid at room temperature has similar optical properties, such as transmittance and reflectance, as that of the heat-bent glass.

According to some embodiments of the present disclosure, the fluid is organic, e.g. UV adhesive, thermoplastic elastomer pressure sensitive adhesive, glue, hot melt adhesive, oil-based glue or water-based glue, resin, etc. However, the present disclosure is not limited thereto.

According to some embodiments of the present disclosure, the fluid is a styrenic thermoplastic elastomer, a type of thermoplastic elastomer pressure sensitive adhesive, which fills the heat-bent glass and at the same time enables the inner surface of the glass to be adhesive so that the repaired heat-bent glass can directly adhere to the screen. Specifically, the styrenic thermoplastic elastomer is a polymer with S-B-S block structure, wherein S is a styrene polymer block, the amount of which is 5 percent by weight to 30 percent by weight, B is a diolefine copolymer block, the amount of which is 70 percent by weight to 95 percent by weight. The linear block copolymer has a weight-average molecular weight of 50,000-500,000, preferably 70,000 to 300,000, and more preferably 80,000 to 250,000. When the weight-average molecular weight is too high, the melt flow rate of the fluid will be too low such that the adhesive properties of the fluid will not be acceptable at larger ranges of temperature. On the other hand, if the weight-average molecular weight is too low, the level of adhesion will not be ideal at higher temperatures, e.g. 35 to 40° C.

Preferably, the amount of the styrene polymer blocks is 10 percent by weight to 25 percent by weight, and more preferably 12 percent by weight to 20 percent by weight. Preferably, the amount of diolefine copolymer block is 75 percent by weight to 90 percent by weight, and more preferably 80 percent by weight to 87 percent by weight. If the amount of styrene polymer blocks is too high, then the adhesive properties of the fluid will be too low. Consequently, undesired adhesive substances will remain when the strippable film, e.g. a release film is removed from a side of the tempered glass. Therefore, the amount of the styrene polymer blocks will affect the adhesive properties whether it is too high or too low, which are both unfavorable for the adhesion between the tempered glass and the screen.

The determination of the amount of each block of the linear copolymer block is common knowledge in the art. For instance, the amount of styrene blocks in a polymer and the amount of diolefine copolymer blocks can be determined using NMR spectroscopy. The determination of a weight-average molecular weight is also common knowledge in the art. For example, a weight-average molecular weight can be derived from a molecular weight through a calibration curve of polystyrene in peak in a gel permeation chromatography (GPC) analysis. More specifically, the condition for a determination can be exemplarily as follows:

Determination Device: GPC HLC-8220 by TOSOH Corporation
Column: TAK gel GMHXL Super H5000/1 columns; ` SuperH4000/2 columns by TOSOH Corporation
Solvent: Tetrahydrofuran (THF)
Temperature: 40 Celsius degree
Samples for calibration curves: standard samples made by TOSOH Corporation which are sold on the market; 10 determinations are made According to some embodiments of the present disclosure, the linear copolymer blocks can exemplarily be one of or a combination of the group consisting of: styrene-butadiene-styrene (SBS), styrene-ethyl-butene-styrene (SEBS) made by the hydrogenation of unsaturated styrene-isoprene-styrene, styrene-ethylene-propylene-styrene (SEPS), and styrene isoprene-styrene (SIS). When two or more of the above mentioned substances are used, the constituent ratio is not limited.

Furthermore, reactive elastomers given a variety of functional groups can be used in the abovementioned hydrogenated styrene elastomer. The abovementioned functional groups can be, but not limited to the following: hydroxyl, carboxyl, carbonyl, generation of carbonyl sulfur, acyl halide, acid anhydride, the carboxylic acid and base, aldehyde, sulfur, aldehyde and carboxylic acid ester, amide group, sulfonic group, sulfonic acid ester base, phosphoric acid, phosphate, amine, amide, nitrile, pyridine, quinoline, epoxy group, sulfur, generation of epoxy group, sulfide, isocyanate, isothiocyanates, silicon halide, alkoxy silicon, tin base, boric acid, boron halide groups, borate, alkoxy tin and tin phenyl base.

According to some embodiments of the present disclosure, the fluid further includes an adhesion improver. The adhesion improver can preferably be oil, including but not limited to mineral oil and synthetic oil. Examples of mineral oil include one of or a combination of: aromatic hydrocarbon, naphthene hydrocarbon and paraffin hydrocarbon. Preferably, the adhesive improver includes at least one of: white oil, naphthenic oil and hydrogenated naphthenic oil. The adhesion improver improves the adhesion and fills the surface.

The fluid includes 70 to 95 percent by weight of the adhesive improver. The higher the amount of the adhesive improver, the higher the enhanced adhesion is. However, an excess amount of adhesion improver may cause the overflowing of the fluid. Therefore, the amount of the adhesion improver must be lower than 95%, preferably lower than 90%, 85%, or 80%. On the other hand, from the perspective of achieving an adhesive angle, the amount of adhesion improver is preferably higher than 70%, and more preferably higher than 75%.

According to some embodiments of the present disclosure, the fluid further includes an 1,3-butadiene unit so as to enhance the mechanical strength of the solidified fluid. The 1,3-butadiene unit can be obtained by introducing a certain amount of butadiene monomers into the fluid when the fluid is being manufactured. The introduced amount of 1,3-butadiene units has to be lower than 10 percent by weigh of the total fluid. If the amount of introduced 1,3-butadiene units is too high, the hardness of the fluid will be too high such that the brittleness thereof will be too high that the adhesive properties are unfavorable, especially when the temperature alters. On the other hand, if the introduced amount is too low, then the mechanical strength of the fluid will be too low, leading to the outflowing of the fluid at higher temperature, e.g. around 40 Celsius degree.

According to some embodiments of the present disclosure, the fluid further comprises an additive so as to give the fluid other properties. The additive can exemplarily be antioxidants so as to enhance the endurance of the fluid.

The antioxidant can be, but not limited to blocked phenolic antioxidants such as 2, 6-2 tertiary butyl-4-methyl phenol, octadecyl-3-(4'-hydroxy-3','5'-two tertiary butyl phenyl) propionate, 2, 2'-methylene double (4-methyl-6-tertiary butyl phenol), 2, 2'-methylene double (4-ethyl-6-tertiary butyl phenol), 2, 4-[(octylthio) methyl] o-cresol, 2-tert-butyl-6-(3-tert-butyl-2-hydroxy-5-methyl benzyl)-4-methyl phenyl acrylate, 2, 4-2 tertiary amyl-6-[1-(3, 5-2 tertiary amyl-2-hydroxy phenyl) ethyl] phenyl acrylate, 2-[1-(2-hydroxy-3, 5-2 tertiary amyl) phenyl] acrylate; sulphur antioxidants such as dilauryl thiodipropionate, lauryl stearic acid dipropionate and pentaerythritol-4 (beta-lauryl sulfyl dipropionate); phosphorus antioxidants such as tri-(nonyl phenyl) phosphite and tri(2,4-di-tert-butylphenyl) phosphite.

According to some embodiments of the present disclosure, the fluid is a UV adhesive, the composition of which can be exemplarily as follows:
Monomer: 40 to 60 percent
Photoinitiator: 1 to 60 percent
Additive: 0.2 to 1 percent
The prepolymer is selected from: epoxy acrylate, polyurethane acrylate, polyether acrylate, polyester acrylate, acrylic resin, etc.
The monomer is selected from: monofunctional monomers such as IBOA, IBOMA, and HEMA, difunctional monomers such as TPGDA, HDDA, DEGDA, NPGDA, trifunctional and multifunctional monomers such as TMPYA, PETA.
The initiator is selected from: 1173, 184, 907, benzophenone.

According to some embodiments of the present disclosure, the amount of fluid used in step S2 can be determined according to the area of the inner surface of the heat-bent glass. More specifically, the amount of fluid needed is greater than the amount that is needed to fill the uneven inner surface of the heat-bent glass. The fluid in a preferred amount can fill the uneven surface and further form a layer with a thickness on the inner side of the heat-bent glass, which is cured to form a cured layer with a thickness smaller than 100 µm. The thickness of the cured layer is preferably smaller than 80 µm, preferably smaller than 50 µm, and more preferably smaller than 30 µm, e.g. 5 µm, 10 µm, 15 µm, 20 µm, 25 µm, etc. According to some embodiments of the present disclosure, the cured layer is not adhesive or has a lower adhesive property. Under this condition, a smaller amount of fluid is preferred, e.g. an amount of fluid that forms a cured layer of a thickness smaller than 5 µm, which can then be combined with an adhesive layer with higher force of adhesion. The adhesive layer is formed of a transparent adhesive common known in the art. For example, the adhesive can be cyanoacrylate, AB glue or invisible glue (UV adhesive.) The adhesive adopted by the present disclosure can be one of or a combination of the above-mentioned adhesives.

The term "mold" disclosed in the present disclosure refers to a component complementing the surface smoothness of the screen of an electronic device. Preferably, the surface smoothness is smaller than or equal to 0.15. The shape of the mold is not limited but must be identical to the shape of the screen of the electronic device and complements the heat-bent glass. The material of the mold can be a material common known in the art, e.g. metal or plastic. The present disclosure is not limited by the material of the mold as long as the mold has a surface smoothness corresponding to that of the screen of the electronic device.

According to some embodiments of the present disclosure, the method includes a step of pressing the inner side of the heat-bent clear glass through a molding process. The way of pressing can be a common pressing process in the art, e.g. a pressing process performed by a machine or an operator. The pressing force must be great enough such that he fluid fully fills the uneven surface of the heat-bent glass and forms a smooth surface or a layer with a thickness.

According to some embodiments of the present disclosure, the way of processing the fluid includes a hot pressing process, which melts the fluid so that the fluid has a fluidity of a certain level. The condition of the hot pressing process can vary in accordance with the properties of the fluid. For example, the hot pressing temperature is 100 to 300° C. and the duration of heating of 1 to 80 seconds when the fluid is a thermoplastic elastomer pressure sensitive adhesive, in which the higher the temperature, the shorter the duration of heating is. For example, when the temperature of the hot pressing mold is 300° C., the duration of the heating is one second, and when the temperature is 80° C., it takes over 50 seconds for the hot pressing process to complete.

According to some embodiments of the present disclosure, the term "curing" refers to the process where a fluid forms a transparent solid. The curing process can be a hot pressing curing process, a UV curing process, natural coagulation or drying. If the fluid is a UV sensitive fluid, e.g. a UV curable fluid, the photo initiator (or photosensitive agent) generates free radicals and cations after exposed to UV radiation, activating the polymerization of monomers and cross-linking reaction such that the adhesive turns solid within a few seconds. If the liquid includes certain types of solvent, the curing can be a drying process.

The First Embodiment

First, make a mold with a shape corresponding to the shape and size of the screen of an electronic device, e.g. a 3.7 inches curved screen in the present embodiment, and then chose a corresponding heat-bent clear glass and then perform a processing process on the heat-bent clear glass. Before the processing of the heat-bent clear glass, the glass has an uneven surface especially in curved portions of the glass, which is formed during the heat bending process and cannot be avoided. At the beginning of the repairing according to the present disclosure, a fluid of 1 ml is provided on the inner side of the heat-bent clear glass, in which the fluid has a certain fluidity at 80 to 300° C. Specifically, the fluid includes SBS elastomer, in which the equivalent weight of polystyrene is 75,000 and the elastomer is bought from DEXCO Polymers, Houston, Tex., naphthenic oil bought from Fu Da petrochemical industry, butadiene monomer, and antioxidants. Next, press the fluid by utilizing a mold complementing the surface smoothness of a screen of the electronic device such that the fluid spreads across the inner side of the heat-bent clear glass and at the same time fills the uneven surface of the heat-bent clear glass.

After the fluid fills the uneven surface, perform a hot pressing process on the fluid for two seconds at 100° C. to cure the fluid and at the meanwhile remove the transparent and solid fluid overflowing from the inner side of the heat-bent clear glass.

At last, cool the cured fluid to room temperature, and the fluid then forms a transparent and solid layer of around 5 μm.

The Second Embodiment

First, make a mold with a shape corresponding to the shape and size of the screen of an electronic device, e.g. a 3.7 inch curved screen in the present embodiment, and then chose a corresponding heat-bent clear glass and then perform a processing process on the heat-bent clear glass. Before the processing of the heat-bent clear glass, the glass has an uneven surface especially in curved portions of the glass, which is formed during the heat bending process and cannot be avoided. At the beginning of the repairing according to the present disclosure, a thermoplastic elastomer pressure sensitive adhesive of 1 ml is provided on the inner side of the heat-bent clear glass and at the same time hot pressing the thermoplastic elastomer pressure sensitive adhesive with a heated mold such that the thermoplastic elastomer pressure sensitive adhesive is softened and can fill the uneven inner surface of the heat-bent glass. The hot pressing temperature and the duration of heating are dependent on the properties of the thermoplastic elastomer pressure sensitive adhesive and the heat-bent clear glass. Specifically, the hot pressing temperature of the present disclosure is 100 to 300 Celsius degree and the duration of heating is 1 to 80 seconds. The higher the temperature, the shorter the duration of heating is. For instance, when the temperature of the hot pressing mold is 300 Celsius degree, the duration of the heating can be one second, and when the temperature is 80 Celsius degree, it takes over 50 seconds to complete the hot pressing process.

At last, cool the thermoplastic elastomer pressure sensitive adhesive to room temperature, and the thermoplastic elastomer pressure sensitive adhesive then forms a transparent and solid layer of around 5 μm.

The Third Embodiment

First, make a mold with a shape corresponding to the shape and size of the screen of an electronic device, e.g. a 3.7 inch curved screen in the present embodiment, and then chose a corresponding heat-bent clear glass and then perform a processing process on the heat-bent clear glass. Before the processing of the heat-bent clear glass, the glass has an uneven surface especially in curved portions of the glass, which is formed during the heat bending process and cannot be avoided. At the beginning of the repairing according to the present disclosure, a fluid that is in a flowing state at a temperature of 80 to 300° C. is provided on the inner side of the heat-bent clear glass. Next, press the fluid by utilizing a mold complementing the surface smoothness of a screen of the electronic device such that the fluid spreads across the inner side of the heat-bent clear glass and at the same time fills the uneven surface of the heat-bent clear glass.

After the fluid fills the uneven surface, perform a hot pressing process on the fluid for two seconds at 100° C. to cure the fluid and at the meanwhile remove the transparent and solid fluid overflowing from the inner side of the heat-bent clear glass.

At last, cool the fluid to room temperature, and the fluid then forms a transparent and solid layer of around 2 μm.

The Fourth Embodiment

First, repairing a heat-bent glass according to the shape and size of the screen of an electronic device by using the method of the second embodiment. In the present embodiment, the screen is a 3.7 inch curved screen. Next, bind the heat-bent glass with a layer of 2 μm to a UV adhesive layer.

The Fifth Embodiment

Repair a heat-bent glass using the method of the first embodiment, in which the fluid is replaced by a UV adhesive manufactured by CRCBOND Corporation, and the hot pressing process is replaced by a UV treatment.

Comparative Example 1

Figure 2:
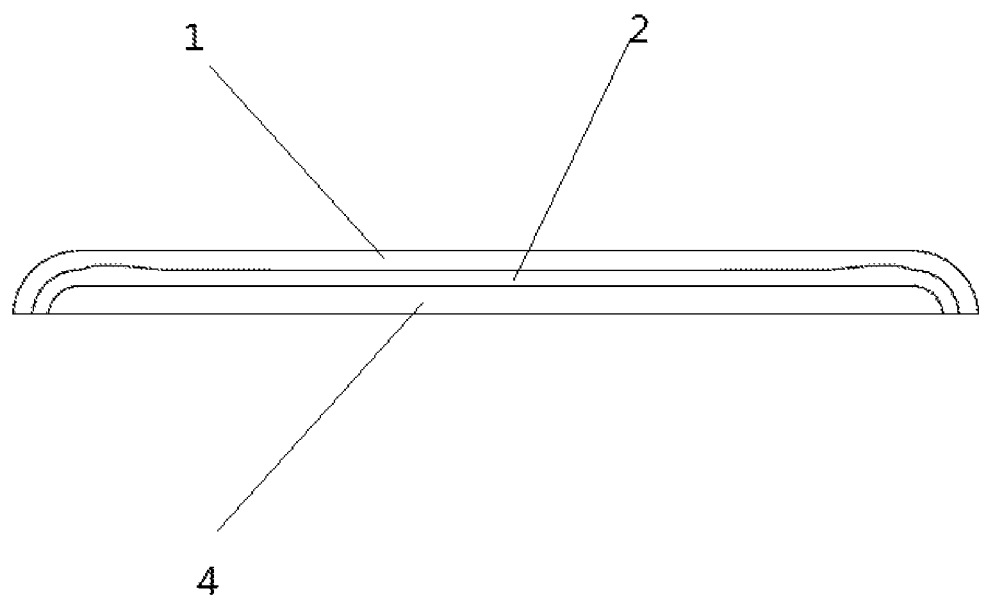
FIG. 2 is a cross sectional view illustrating an adhesive layer stuck to a heat-bent clear glass repaired by using the method of the present disclosure.

Referring to FIG. 2, combining an adhesive layer 2 including a PET material and a UV adhesive with a heat-bent clear glass 1 by a pressing process, in which the heat-bent clear glass 1 is the same as the heat-bent clear glass 1 of the first embodiment.

The following presents the comparison of the level of adhesion between the heat-bent glass 1 repaired by the method of the present disclosure and the screen 4 of an electronic device and the level of adhesion between the comparative glass and the screen 4 of an electronic device. More specifically, the level of adhesion compared is the strippability and the level of fitness.

Evaluation of Strippability

First, bind a heat-bent glass 1 repaired by using the method of the present disclosure to a 3.7 inch curved screen of a cell phone as a screen protector. After the heat-bent glass 1 fully adheres to the screen 4, leave the cell phone in an environment with a relative humidity of 25° C. x50% for three days. Next, remove the screen protector and evaluate the strippability based on the amount of remained compound on the screen 4. The level of strippability is marked with ◯, Δ, and x. The criterion is as follows.

◯ high strippability; spots of remained compound that are visible: none

Δ: good strippability; spots of remained compound that are visible: 1 to 2 x: low strippability, spots of remained compound that are visible: 3 or above

Evaluation of Fitness

Evaluate the fitness between the compared heat-bent glasses and a 3.7 inch curved screen in an environment with a relative humidity of 50% and other conditions mentioned in table 1, in which the level of fitness is evaluated according to the ratio of the area of fitted part and that of gap parts. The observation is performed with eyes. The level of fitness is marked with ⊚, ◯, Δ, x. The criterion is as follows.

⊚: no bubbles visible

◯: number of bubbles that are visible: 1

Δ: number of bubbles that are visible: 2 to 4 x: number of bubbles that are visible: 5 or above

TABLE 1

| | Embodiment 1 | Embodiment 2 | Embodiment 3 | Embodiment 4 | Embodiment 5 | Comparative 1 |
|---|---|---|---|---|---|---|
| Strippability | ◯ | Δ | Δ | Δ | Δ | Δ |
| Fitness −5° C.; 24 Hrs | ⊚ | ⊚ | ⊚ | ⊚ | ⊚ | X |
| 25° C.; 24 Hrs | ⊚ | ⊚ | ⊚ | ⊚ | ⊚ | Δ |
| Temperature cycling: −5° C. to 25° C. to −5° C.; temperature cycling is performed 50 times (2 hr for each cycle) | ◯ | ⊚ | ⊚ | ⊚ | ⊚ | X |

Any kind of adhesives that are well known in the field of screen protector can adhere to the inner surface of a heat-bent glass 1 whose surface smoothness is repaired by the method of the present disclosure through a brush coating process or a sticking process. The heat-bent clear glass 1 can then be stuck to the screen 4 of an electronic device via the adhesive layer 2. Since the uneven surface of the heat-bent clear glass 1 is filled by the adhesive layer 2, no air bubble will be generated on the screen 4 after the screen protector adheres to the screen 4, resulting in an appealing appearance of the electronic device.

The above-mentioned descriptions represent merely the exemplary embodiment of the present disclosure, without any intention to limit the scope of the present disclosure thereto. Various equivalent changes, alterations or modifications based on the claims of the present disclosure are all consequently viewed as being embraced by the scope of the present disclosure.

What is claimed is:

1. A method of repairing surface smoothness of a heat-bent glass, comprising the following steps:
    S1: providing a fluid which is transparent and solid at room temperature on an inner side of a heat-bent clear glass used for manufacturing a screen protector of an electronic device;
    S2: by utilizing a mold complementing the surface smoothness of a screen of the electronic device, pressing the inner side of the heat-bent clear glass through a molding process and at the same time processing the fluid on the inner side of the heat-bent clear glass so that the fluid fill a curved and uneven surface of the inner side of the heat-bent clear glass; and
    S3: curing the fluid so that the inner surface of the heat-bent clear glass has a curvature and smoothness that match the curvature and smoothness of the screen of the electronic device,
    wherein the fluid is a thermoplastic elastomer pressure-sensitive adhesive that is transparent at room temperature.

2. The method according to claim 1, wherein the way of processing the fluid includes a hot pressing process and/or the way of curing fluid includes a UV curing process, natural coagulation or drying.

3. The method according to claim 2, wherein the fluid is selected from at least one of the group consisting of: UV adhesive, thermoplastic elastomer pressure-sensitive adhesive, glue, hot melt adhesive, oil-based adhesive or water-based adhesive, and resin.

4. The method according to claim 2, further comprising: removing the fluid overflowing from the heat-bent clear glass during the molding process.

5. The method according to claim 1, wherein the fluid is selected from at least one of the group consisting of: UV adhesive, thermoplastic elastomer pressure-sensitive adhesive, glue, hot melt adhesive, oil-based adhesive or water-based adhesive, and resin.

6. The method according to claim 5, further comprising: removing the fluid overflowing from the heat-bent clear glass during the molding process.

7. The method according to claim 1, further comprising: removing the fluid overflowing from the heat-bent clear glass during the molding process.

8. The method according to claim 1, wherein in step S2, the mold is heated to 80-300° C. and the duration of heating is 1-80 seconds.

9. The method according to claim 1, wherein a melt flow rate of the fluid is 1.0 g/10 min to 30 g/10 min at a temperature of 230° C. and with a loading of 2.16 kg, and the fluid is transparent and solid at a temperature of 10-30° C..

10. The method according to claim 1, wherein the transparent fluid includes a linear block copolymer, an adhesion improver, a butadiene unit and an additive, and wherein the linear block copolymer has a weight-average molecular weight of 50,000-500,000 and a block structure of S-B-S, in which S is a styrene polymer block, the amount of which is 5 percent by weight to 30 percentage by mass, B is a diolefine copolymer block, the amount of which is 70 percent by weight to 95 percent by weight, and a weight ratio of the linear block copolymer to the adhesion improver is 1:40-50.

11. The method according to claim 10, wherein the linear block copolymer is selected from at least one of the group consisting of: SIS, SBS, SEBS and SEPS, and the adhesion improver is selected from at least one of the group consisting of white oil, naphthenic oil and hydrogenated naphthenic oil.

12. A laminated structure, comprising a heat-bent glass with a surface repaired using the method according to claim 1.

* * * * *